United States Patent
Choudhary et al.

(10) Patent No.: US 11,920,678 B1
(45) Date of Patent: Mar. 5, 2024

(54) PARKING PAWL PIN BORE SUPPORT

(71) Applicant: GM Global Technology Operations LLC, Detroit, MI (US)

(72) Inventors: Lokesh Choudhary, Bangalore (IN); Qigui Wang, Rochester Hills, MI (US); Wenying Yang, Rochester Hills, MI (US); Marcel Taran, Novi, MI (US); Gregory Melekian, Clarkston, MI (US); Alexey Rubin, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/168,139

(22) Filed: Feb. 13, 2023

(51) Int. Cl.
| | |
|---|---|
| *F16H 63/34* | (2006.01) |
| *B60T 1/00* | (2006.01) |
| *B60T 1/06* | (2006.01) |

(52) U.S. Cl.
CPC .......... *F16H 63/3433* (2013.01); *B60T 1/005* (2013.01); *B60T 1/062* (2013.01)

(58) Field of Classification Search
CPC ... F16H 63/3425; F16H 63/3433; B60T 1/005
See application file for complete search history.

(56) References Cited

U.S. PATENT DOCUMENTS

| | | | | |
|---|---|---|---|---|
| 1,378,015 | A | * 5/1921 | Erickson | F16L 15/006 285/392 |
| 4,295,394 | A | * 10/1981 | DeCaro | B25B 23/04 81/57.37 |
| 6,125,983 | A | * 10/2000 | Reed, Jr. | B60T 1/005 192/219.5 |
| 2015/0345657 | A1 | * 12/2015 | Lobo | F16H 37/124 251/229 |
| 2018/0298842 | A1 | * 10/2018 | Wang | F02F 1/004 |
| 2019/0024708 | A1 | * 1/2019 | Wilson | F16C 17/12 |
| 2019/0277401 | A1 | * 9/2019 | Nofzinger | F16H 63/3433 |

FOREIGN PATENT DOCUMENTS

CN      209309301 U  *  8/2019   .........  F16H 63/3425

* cited by examiner

*Primary Examiner* — Huan Le
*Assistant Examiner* — Aimee Tran Nguyen
(74) *Attorney, Agent, or Firm* — Vivacqua Crane, PLLC

(57) ABSTRACT

A parking pawl assembly having a housing, a parking pawl having a pin bore, a support sleeve fitted in the pin bore, and a pivot pin inserted through the support sleeve. The pivot pin is attached to the housing, thus pivotally attaching the parking pawl to the housing. The parking pawl includes a first end and a second end spaced from the first end. The first end defines the pin bore having an interior bore surface. The support sleeve includes an exterior surface fitted to the interior bore surface of the parking pawl. The exterior surface of the support sleeve may include outer diameter rolled threads or other locking features. The interior bore surface of the parking pawl may include inner diameter rolled threads operable to receive the outer diameter rolled threads of the support sleeve.

20 Claims, 10 Drawing Sheets

PARKING PAWL PIN BORE SUPPORT

INTRODUCTION

The present disclosure relates to a vehicle gear box having a parking pawl assembly, more specifically to a parking pawl having a pin bore support.

A vehicle having an internal combustion engine with an automatic transmission utilizes a parking pawl assembly to lock the gears of the transmission when the gear selector is shifted into a park setting, thus locking the drive wheels, and prevent the vehicle from rolling from the original parked position. Similarly, hybrid and electric vehicles utilize a parking pawl assembly to lock a component of the drive train, such as a drive gear or a drive shaft. The parking pawl assembly includes a parking pawl that selectively locks the drive train of the vehicle by engaging a notched wheel that is rotationally fixed to a gear, output shaft, or other torque transmitting components of the drive train. The parking pawl needs to be sufficiently robust to preventing the vehicle from rolling even when the vehicle is parked on an incline.

While parking pawl assemblies are useful for their intended purpose, the need to improve parking pawl assemblies for more robust performance, especially from the standpoints of improved durability and reliability, is essentially constant. Accordingly, there is a need for an improved cost-effective parking pawl assembly for use in a conventional, hybrid, and/or electric vehicles.

SUMMARY

According to several aspects, a parking pawl assembly is disclosed. The parking pawl assembly includes a housing, a parking pawl having a first end defining a pin bore having an interior bore surface and a second end spaced from the first end, a support sleeve disposed in the pin bore, and a pivot pin disposed through the support sleeve. The pivot pin is attached to the housing. The support sleeve includes an interior surface and exterior surface opposite the interior surface. The exterior surface of the support sleeve is engaged to the interior bore surface.

In an additional aspect of the present disclosure, the exterior surface of the support sleeve is interference fitted against the interior bore surface of the pin bore. The support sleeve includes a designed inner diameter ($d_1$) a designed outer diameter ($d_0$), an inner diameter ($ID_{sleeve}$), and an outer diameter ($OD_{sleeve}$). The pin bore includes an inner diameter ($ID_{bore}$). The pivot pin includes an outer diameter ($OD_{pin}$). The $OD_{sleeve}=d_0+0.25\%$ $d_0+/-0.005$ millimeters (mm); $ID_{sleeve}=d_1+0.25\%$ $d_1+/-0.1\%$ $d_1$; $ID_{Bore}=d_0+/-0.010$ to $0.015$ mm; and $OD_{Pin}=d_1+/-0.1\%$ $d_1$.

In another aspect of the present disclosure, the exterior surface of the support sleeve defines outer diameter threads, and the interior bore surface defines inner diameter threads configured to receive the outer diameter threads of the support sleeve. At least one of the outer diameter threads and inner diameter threads are rolled threads. The support sleeve includes an end annular surface connecting the interior surface and the exterior surface, the annular surface defines at least one notch operable to receive a tool end.

In another aspect of the present disclosure, the exterior surface of the support sleeve defines a locking feature. The interior bore surface is cast onto the locking feature such that the support sleeve is locked in the pin bore of the parking pawl. The locking feature includes at least one of a rough texture, a groove, a spline, and a spiny-lock.

In another aspect of the present disclosure, the support sleeve is formed of a cold sprayed process by particle deposition onto the interior surface of the pin bore.

In another aspect of the present disclosure, the support sleeve includes an inner layer having a first metal alloy and an outer layer having a second metal alloy.

According to several aspects, a parking pawl having a support sleeve is disclosed. The parking pawl includes a first end and a second end defining a locking tooth spaced from the first end. The first end defines a pin bore having an interior bore surface. The support sleeve is disposed in the pin bore. The support sleeve includes an interior surface and exterior surface opposite the interior surface. The exterior surface of the support sleeve is engaged to the interior bore surface.

In an additional aspect of the present disclosure, the exterior surface of the support sleeve defines outer diameter (OD) threads, and the interior bore surface defines inner diameter (ID) threads configured to receive the OD threads of the support sleeve. At least one of the OD threads and the ID threads are rolled threads.

In another aspect of the present disclosure, the support sleeve includes:
  a designed inner diameter ($d_1$),
  a designed outer diameter (do),
  an inner diameter ($ID_{sleeve}$), and
  an outer diameter ($OD_{sleeve}$); and
  the pin bore includes an inner diameter ($ID_{bore}$);
  wherein:
    $OD_{sleeve}=d_0+0.25\%$ $d_0+/-0.005$ millimeters (mm);
    $ID_{Sleeve}=d_1+0.25\%$ $d_1+/-0.1\%$ $d_1$; and
    $ID_{Bore}=d_0+/-0.010$ to $0.015$ mm.

In another aspect of the present disclosure, the support sleeve is formed of a cold sprayed process by particle deposition onto the interior surface of the pin bore.

In another aspect of the present disclosure, the exterior surface defines a locking feature. The interior bore surface is cast onto the locking features such that the support sleeve is locked in the pin bore of the parking pawl.

According to several aspects, a pivot pin bore support sleeve is disclosed. The pivot pin bore support sleeve includes an interior surface and exterior surface opposite the interior surface. The exterior surface includes a feature lockable to an interior surface of a pin bore.

In an additional aspect of the present disclosure, the feature lockable to the surface of the bore includes rolled inner diameter threads.

In another aspect of the present disclosure, the feature lockable to the surface of the bore includes at least one of an indentation, a protrusion, a spline, and a texture.

In another aspect of the present disclosure, the support sleeve is manufactured by a cold sprayed process onto the interior surface of the pin bore.

In another aspect of the present disclosure, the support sleeve includes an end annular surface connecting the interior surface and the exterior surface. The annular surface defines at least one notch operable to receive a tool end.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
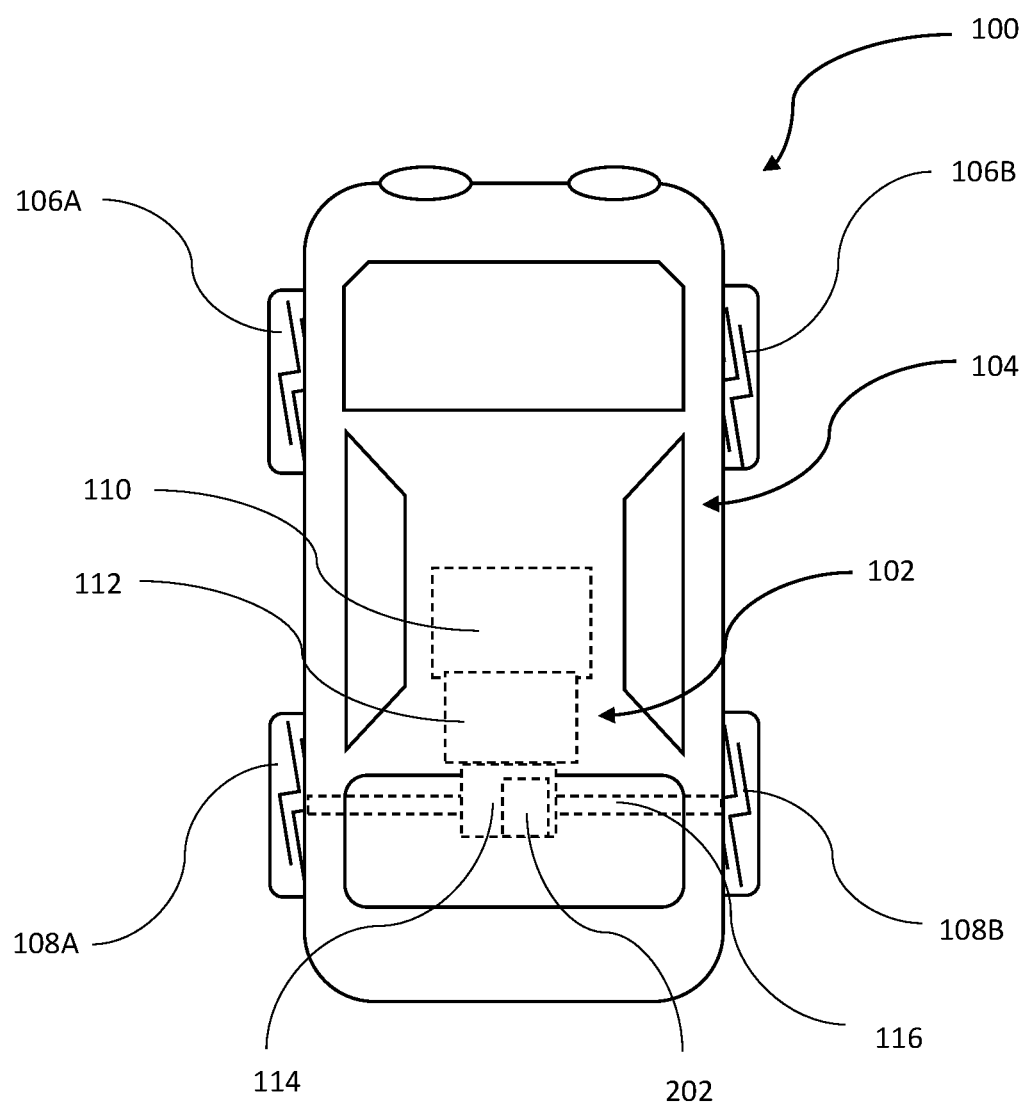
FIG. 1 is a diagram of a plan view of an electric vehicle having an electric drive unit (EDU), according to an exemplary embodiment.

FIG. 1 is a diagrammatic illustration of an electric vehicle 100 having an Electric Drive Unit (EDU) 102. The vehicle 100 generally includes a body 104 having front wheels 106A, 106B and rear wheels 108A, 108B. The front wheels 106A, 106B and the rear wheels 108A, 108B are each rotationally located near a respective corner of the body 104. The EDU includes three (3) modules: a power electronics 110, an electric motor 112, and a transmission 114 or gear box 114. The power electronics are responsible for the conversion of DC voltage from rechargeable batteries (not shown) into a three-phase AC voltage for the overall operation and control of the electric motor 112. The electric motor 112 converts electrical energy into mechanical torque, which is transmitted through the gear box 114 and mechanical linkages 116 to one or more of the wheels 106A, 106B, 108A, 108B for propelling the vehicle 100. The gear box 114 includes a parking pawl assembly 202 having a parking pawl 210 configured to engage a parking gear 206 or an output shaft (not shown) of the gear box 114 to prevent the vehicle 100 from rolling when the gear box 114 is a park setting.

Figure 2:
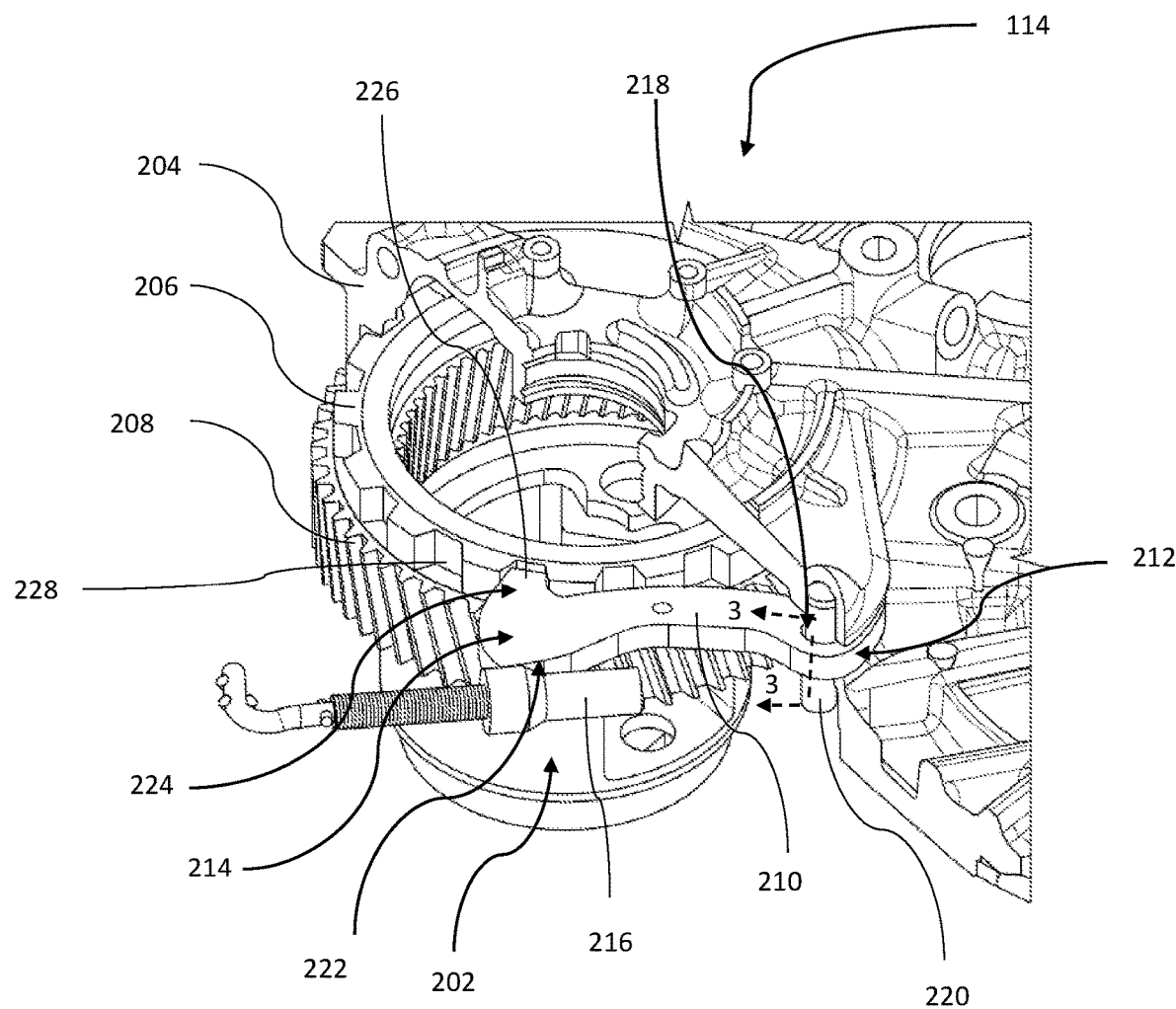
FIG. 2 is an illustration of a cutaway perspective view of a parking pawl assembly for the EDU, according to an exemplary embodiment.

FIG. 2 shows a cut-away perspective view of the gear box 114 having the parking pawl assembly 202. The parking pawl assembly 202 is disposed within a housing 204. The housing 204 is manufactured of a cast aluminum alloy such as A380 using high pressure die casting process or A356 alloy using sand casting process. The components of the parking pawl assembly 202 include a parking gear 206 rationally fixed to a drive gear 208, a parking pawl 210 having a first end 212 pivotally supported by the housing 204 and a second end 214 engageable with the parking gear 206 to lock the drive gear 208 in a non-rotational position, and an actuator 216 configured to selectively act on the parking pawl 210 to pivot the parking pawl 210 to engage the parking gear 206.

The first end 212 of the parking pawl 210 defines a pin bore 218 having an interior bore surface 219. A pivot pin 220, also known as a pawl pin 220, is disposed through the pin bore 218 of the parking pawl 210. The pivot pin 220 is attached to the housing 204, thus pivotally supporting the parking pawl 210 to the housing 204. The second end 214 of the parking pawl 210 includes a first portion 222 configured to receive an action from the actuator 216 and a second portion 224 defining a locking tooth 226. The parking gear 206 defines a plurality of notches 228 configured to receive the locking tooth 226 of the parking pawl 210. Upon the actuator 216 acting on the first portion 222 of the parking pawl 210, the parking pawl 210 pivots about the pivot pin 220 causing the locking tooth 226 to engage one of the plurality of notches 228, thus locking the drive gear 208 and preventing the drive wheel of the vehicle 100 from rolling.

Figure 3:
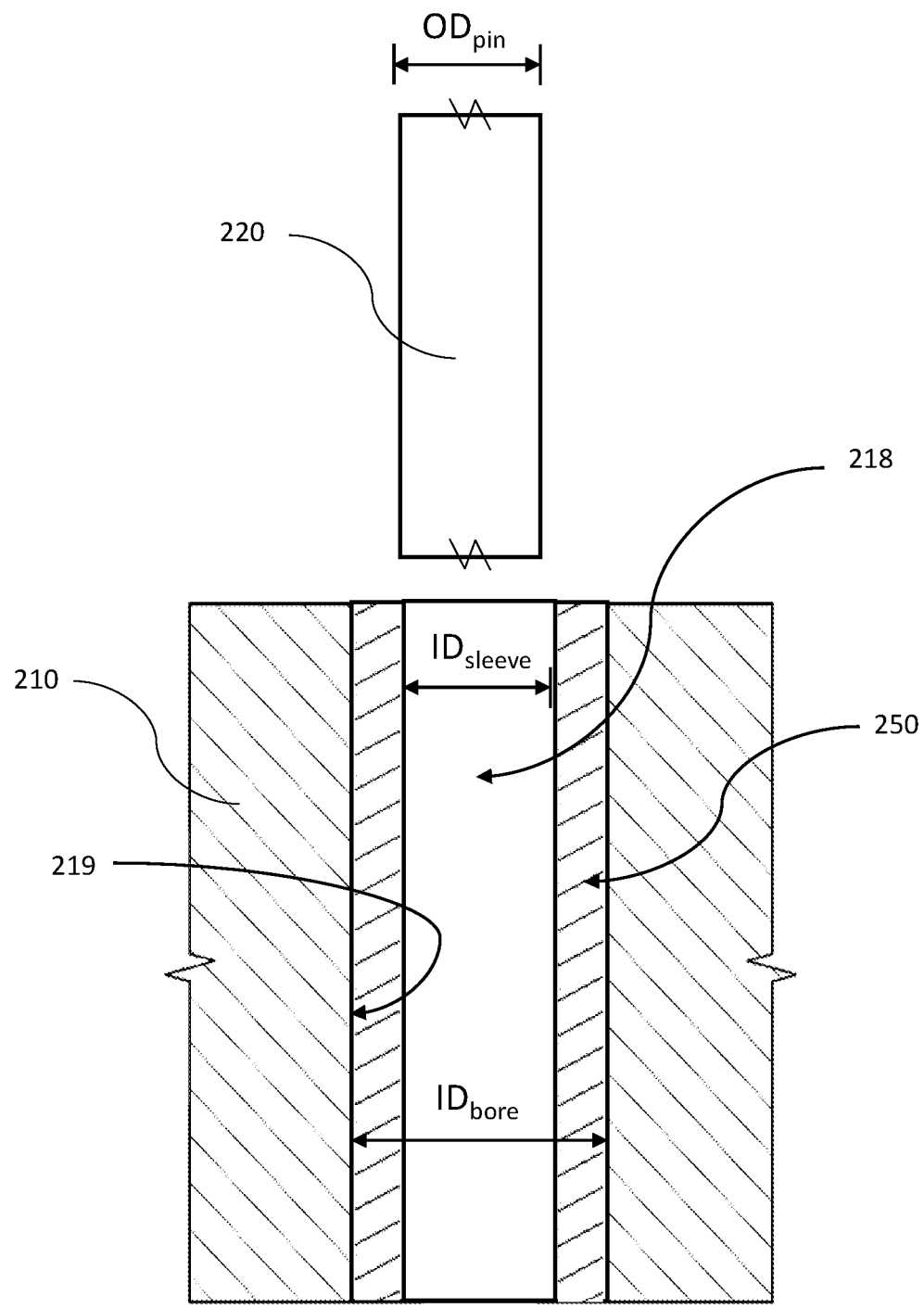
FIG. 3 is an illustration of a cross-section of a pin bore having a pin bore support sleeve across section line 3-3 of the parking pawl assembly of FIG. 2, according to an exemplary embodiment.

FIG. 3 shows an illustration of a cross-section of the parking pawl 210 across section line 3-3 of the parking pawl assembly 202 of FIG. 2. For clarity of illustration and description, the pivot pin 220 is shown retracted out of the pin bore 218 of the parking pawl 210. The pivot pin 220 includes an outer diameter ($OD_{pin}$). In the non-limiting embodiment shown, the parking pawl 210 is cast with an aluminum casting alloy such as A380 and A356. The pin bore 218 is formed by drilling through the parking pawl 210 after the casting is cooled to solidification and removed from the casting die. The pin bore 218 includes an inner diameter ($ID_{bore}$) sufficient to receive a pin bore support sleeve 250, also referred to as bore support sleeve 250 or support sleeve 250 for brevity. The bore support sleeve 250 includes an inner diameter ($ID_{sleeve}$) sufficient to receive the pivot pin 220.

Figure 4:
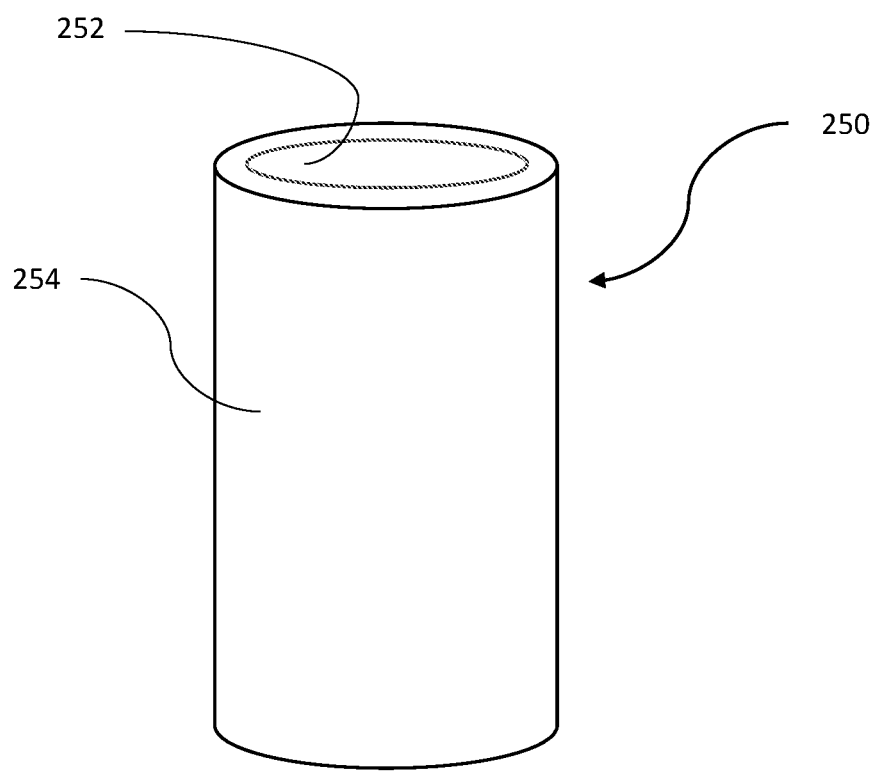
FIG. 4 is an illustration of a perspective view of the pin bore support sleeve of FIG. 3, according to an exemplary embodiment.
Figure 5:
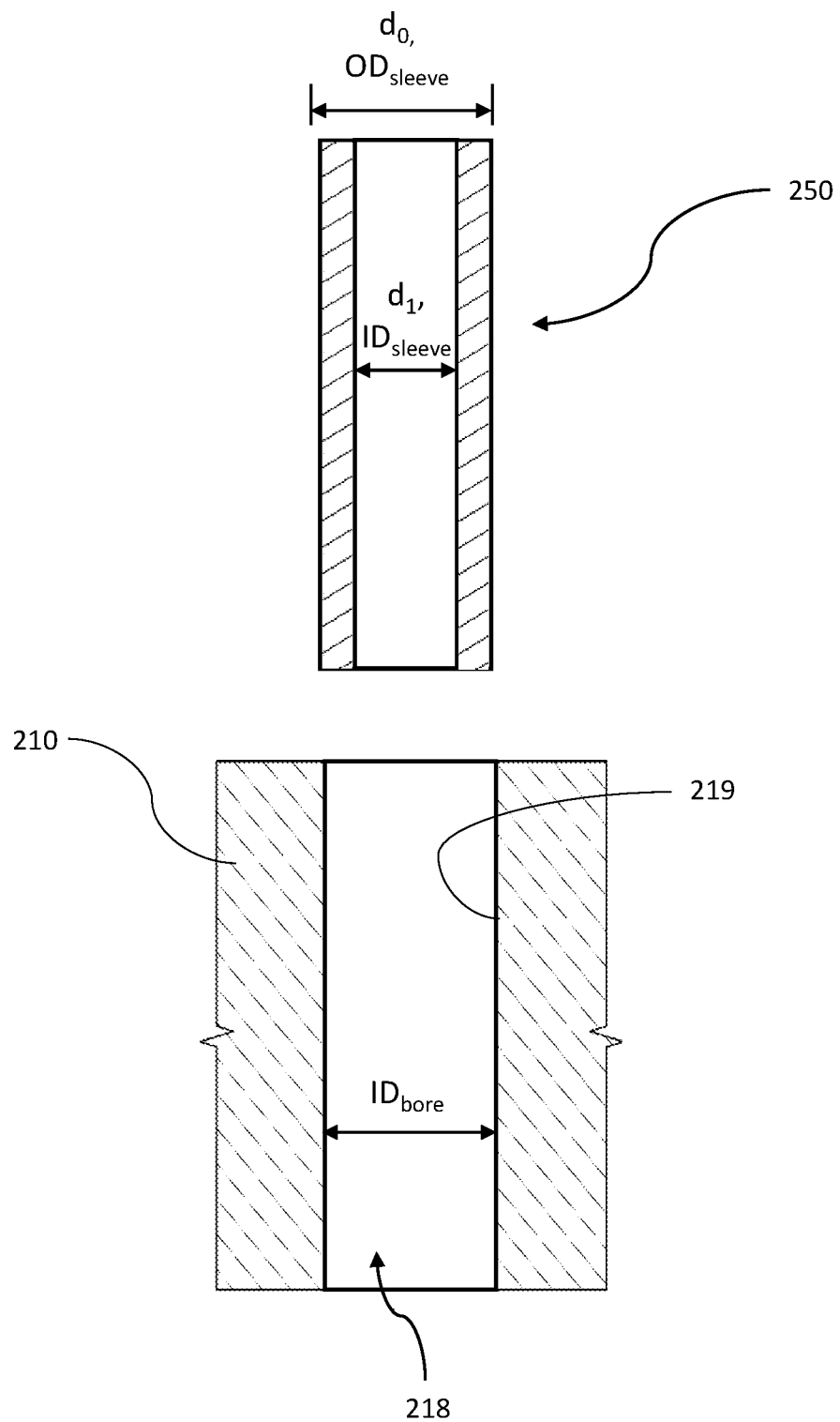
FIG. 5 is an illustration of a cross-section of the pin bore support sleeve spaced from the pin bore of FIG. 3, according to an exemplary embodiment.

FIG. 4 shows a perspective view of a cylindrical pin bore support sleeve 250 having a smooth interior surface 252 and a smooth exterior surface 254. FIG. 5 shows a cross-section of the pin bore sleeve 250 spaced from the pin bore 218 of FIG. 3. Referring to FIGS. 3 through 5, the support sleeve 250 includes an inner diameter ($ID_{sleeve}$) sufficiently large to receive the outer diameter of the pivot pin 220 ($OD_{pin}$). The support sleeve 250 also includes an outer diameter ($OD_{sleeve}$) that enables the support sleeve 250 to be interference fitted against the inner diameter of the pin bore ($ID_{bore}$) defined by an interior surface 219 of the pin bore 218. The pivot pin 220 and the support sleeve 250 are formed of a steel alloy. The support sleeve 250 may also be formed of a high strength wrought aluminum alloy (e.g. 6061, 7000) or a cast aluminum alloy (e.g. A206).

To account for the differences in mechanical properties of the steel or aluminum support sleeve 250, steel pivot pin 220, and cast aluminum parking pawl 210, it was found that the certain dimensional relationships based on a designed inner diameter ($d_1$) and a designed outer diameter ($d_o$) of the support sleeve 250 provides an exceptional interference fit between the support sleeve 250 and pin bore 218, increases strength and durability in the support of the parking pawl 210 by the pivot pin 220, and increases wear resistance between the pivot pin 220 and interior surface 219 of the pin bore 218. The designed ($d_1$) and ($d_0$) are determined based on the required operating parameters of the parking pawl assembly 202. The dimensional relationships based on ($d_1$) and ($d_0$) are:

the $OD_{sleeve} = d_0 + 0.25\%\ d_0 +/- 0.005$ millimeters (mm);
the $ID_{sleeve} = d_1 + 0.25\%\ d_1 +/- 0.1\%\ d_1$;
the $ID_{Bore} = d_0 +/- 0.010$ to $0.015$ mm; and
the $OD_{pin} = d_1 +/- 0.1\%\ d_1$.

Figure 6:
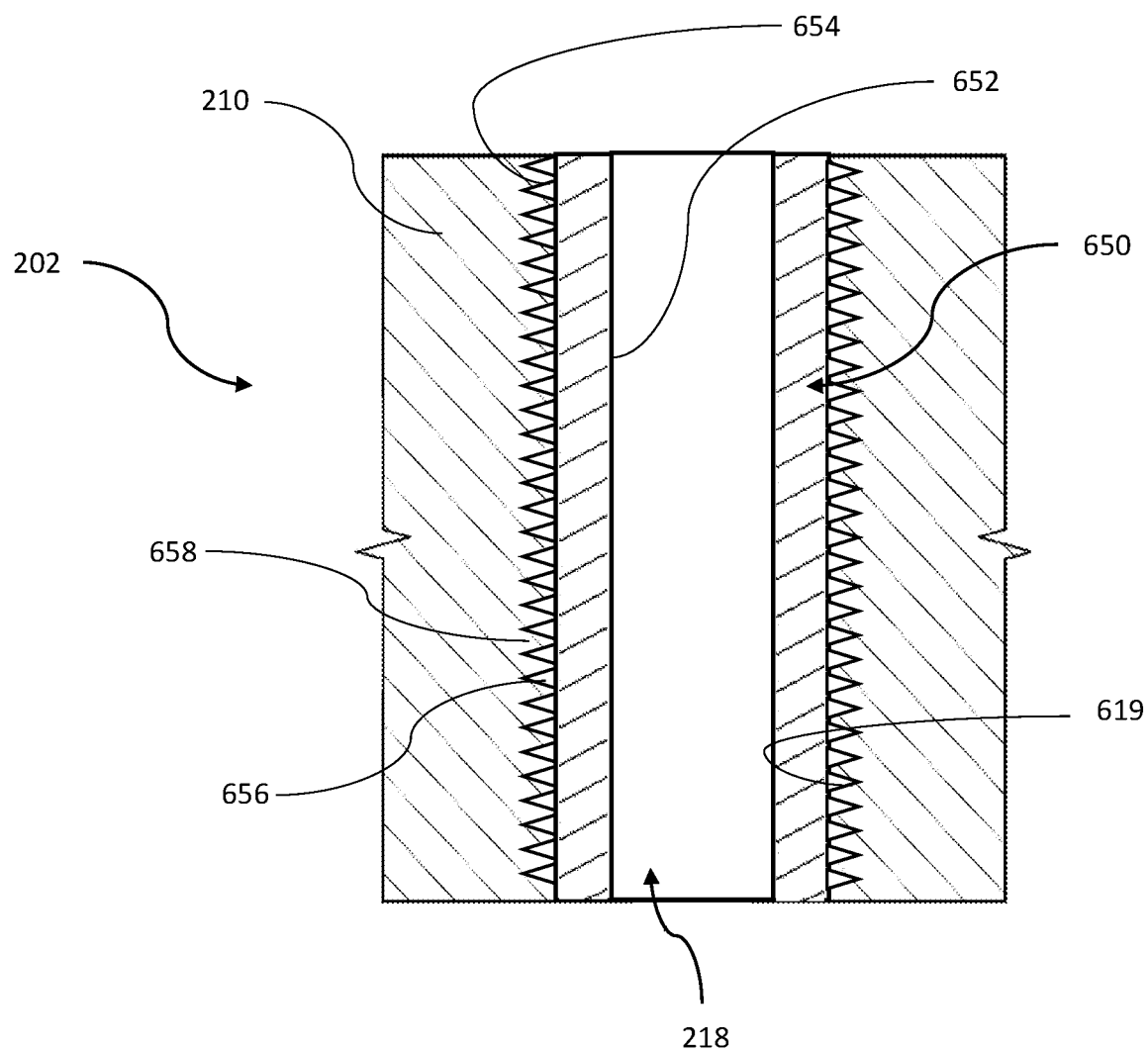
FIG. 6 is an illustration of another exemplary embodiment of a pin bore support sleeve, according to an exemplary embodiment.

FIG. 6 shows an illustration of a cross-section of the parking pawl 210 across section line 3-3 having another embodiment of the support sleeve 650. In this particular embodiment, the support sleeve 650 includes a smooth interior surface 652 and an exterior surface 654 defining outer diameter threads 656 ($OD_{sleeve\ threads}$ 656), which are mated to inner diameter threads 658 ($ID_{bore\ threads}$ 658) defined by the interior surface 619 of the pin bore 218 of the parking pawl 210. Both the $OD_{sleeve\ threads}$ 656 and the $ID_{bore\ threads}$ 658 are rolled threads.

Rolled threads are formed by a cold forming process that uses hardened steel dies for forming the rolled threads in the pin bore 218 of the parking pawl 210 and forming the OD sleeve threads 656 onto the exterior surface 654 of a cylindrical metal workpiece. The dies protrude into the surfaces of the pin bore 218 and cylindrical work piece to form rolled threads. As the surfaces are rolled under high pressure, the steel grain flows in multiple directions, causing the threads to be stronger, as it does not disturb the structural integrity of the metal. Rolled $OD_{sleeve\ threads}$ 656 are smoother in installation into the rolled $ID_{bore\ threads}$ 658 of the parking pawl 210 and are more resistant to damage due to the threads being hardened and compressed by the rolling process. Rolled threads provides compressive residual stress due to rolling thread process which increases fatigue strength.

The configuration of rolled $OD_{sleeve\ threads}$ 656 provides residual compressive stress of greater than 100 megapascal (MPa) in the wall of the support sleeve 650 due to the rolling process on exterior surface, which helps in increasing fatigue strength. If cracks or fractures are initiate in the rolled surfaces, the cracks or fractures will not propagate due to the residual compressive stress. The rolled $OD_{sleeve\ threads}$ 656 are engaged with the rolled $ID_{bore\ threads}$ 658. Failure at this interface between the support sleeve 650 and the parking pawl 210 is also avoided due to the residual compressive stress in the rolled $OD_{sleeve\ threads}$ 656 and rolled $ID_{bore\ threads}$ 658.

Figure 7:
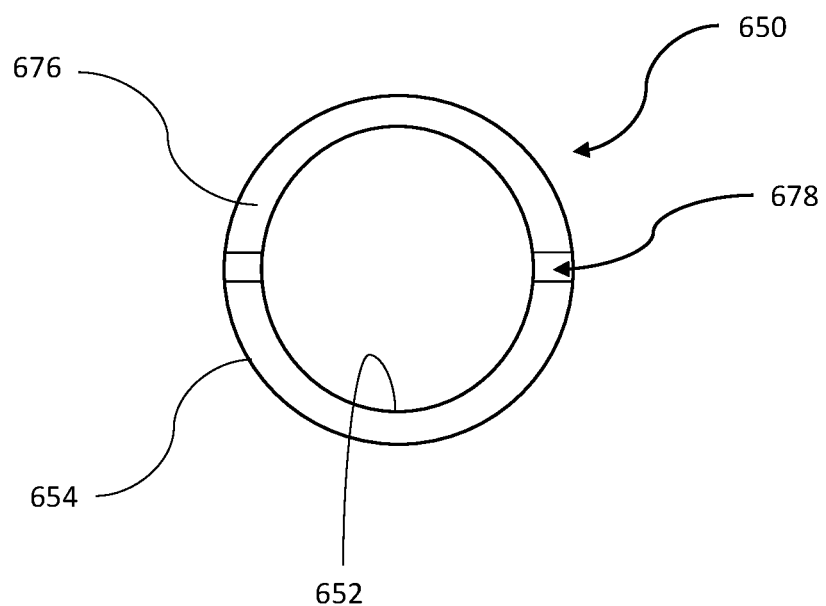
FIG. 7 is an illustration of a top view of the pin bore support sleeve of FIG. 6, according to an exemplary embodiment.

FIG. 7 shows a top view of the pin bore support sleeve 650 of FIG. 6. The support sleeve 650 includes an end annular surface 676 connecting the interior surface 652 and the exterior surface 654. The end annular surface 676 defines at least one notch 678 for the insertion of a tool end, such as that of a large flat screwdriver, for rotatably inserting the support sleeve 650 into the pin bore 218 of the parking pawl 210.

Figure 8:
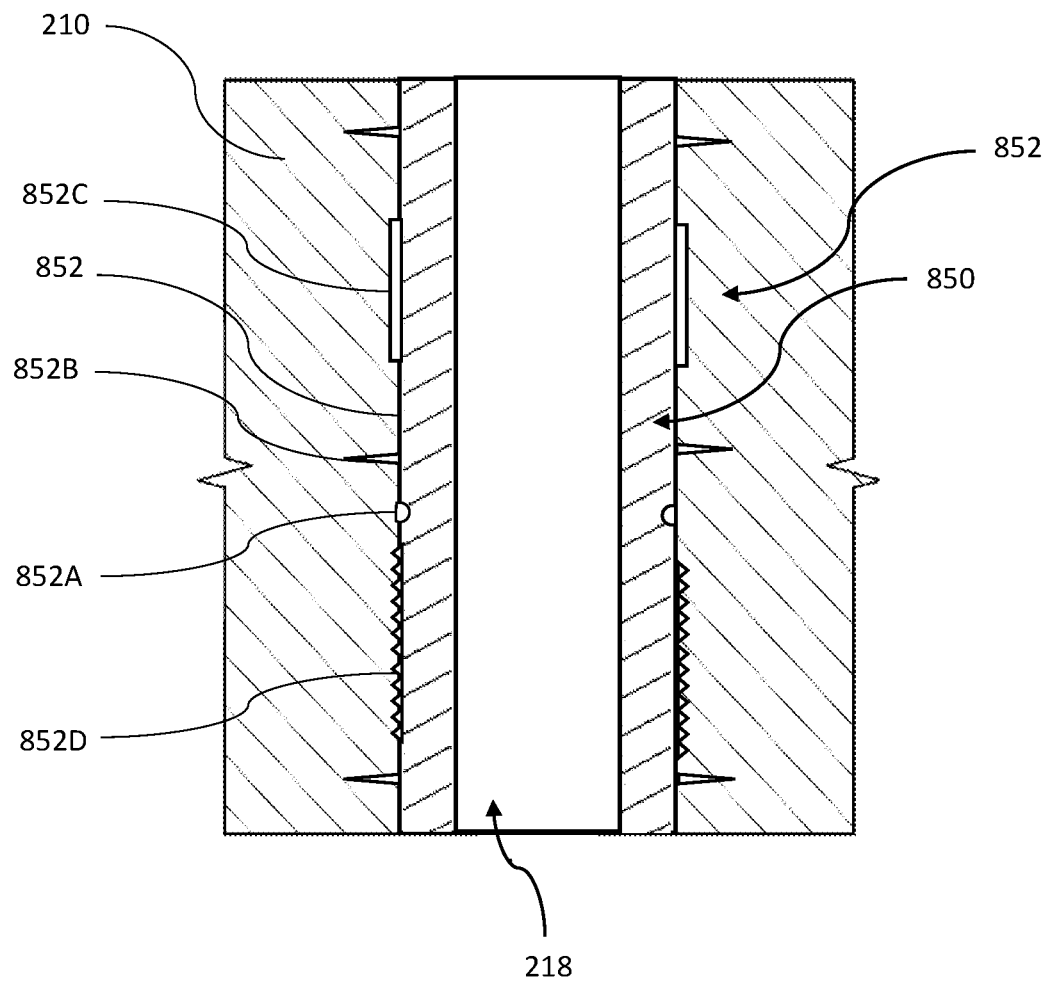
FIG. 8 is an illustration of yet another exemplary embodiment of a pin bore support, according to an exemplary embodiment.

FIG. 8 is an illustration of yet another exemplary embodiment of a pin bore support sleeve 850, also referred to as support sleeve 850. The support sleeve 850 includes locking features 852 on the exterior surface 854. The locking features includes at least one of an indentation as grooves 852A, a protrusion 852B such as a spiny-lock, a spline 852C, and a textured surface 852D such as a rough bumpy surface. In this embodiment, the parking pawl 210 is cast onto the support sleeve 850 thereby encapsulating the exterior surface of the support sleeve 850. The locking features 852 increases the surface area in contact between the support sleeve 850 and the cast alloy forming the parking pawl and aids in anchoring and locking the support sleeve 850 onto the parking pawl 210. The cast-in pin bore support 850 also functions as a local chill with the aid of the increased surface area in contact with the molten casting alloy.

Figure 9:
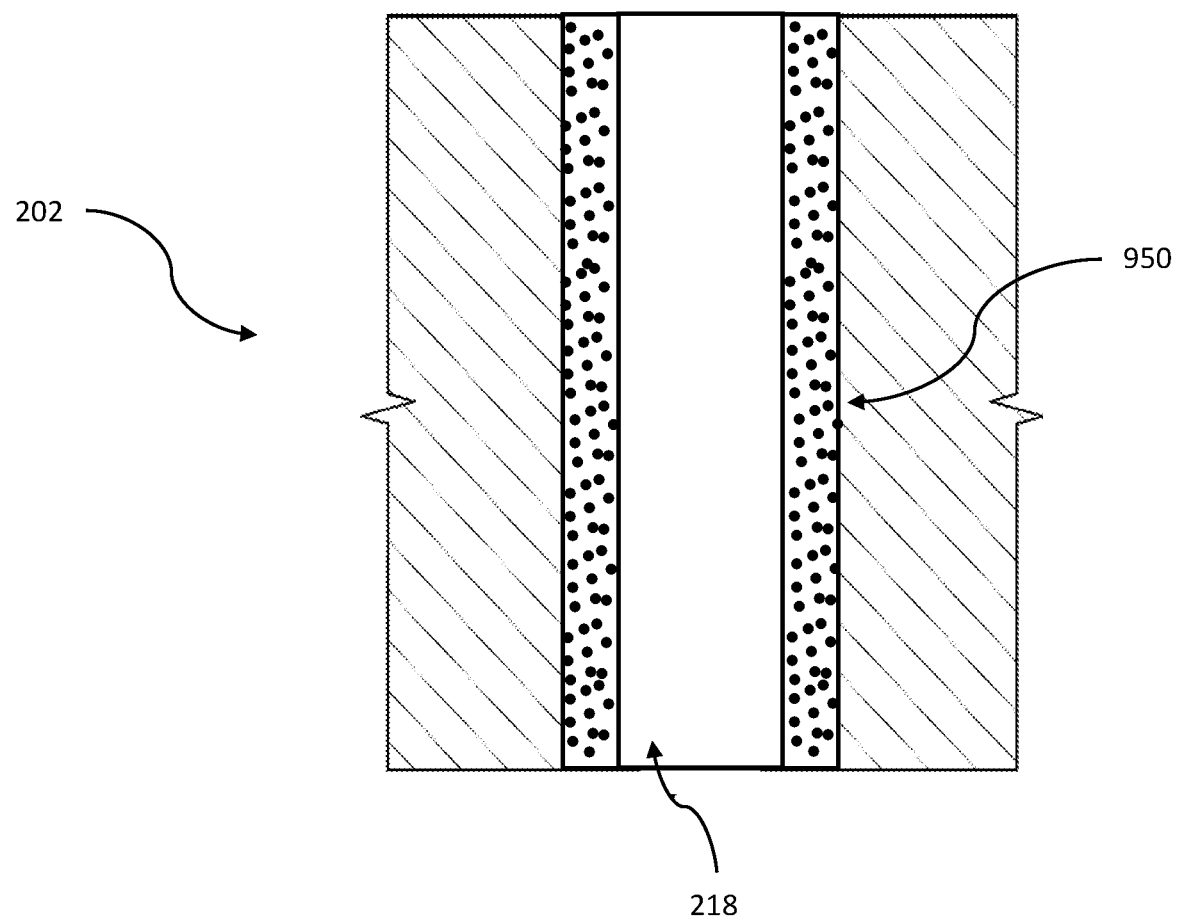
FIG. 9 is an illustration of yet another exemplary embodiment of a pin bore support, according to an exemplary embodiment.

FIG. 9 is an illustration of yet another exemplary embodiment of the pin bore support sleeve 950, also referred to as support sleeve 950. In the non-limiting example shown, the support sleeve 950 is formed on the interior surface 219 of the pin bore 218 by a particle deposition process such as cold spray. Cold spray is a high-energy solid-state coating and powder consolidation process. Cold spray uses an electrically heated high-pressure carrier gas, such as nitrogen or helium, to accelerate metal powders through a supersonic nozzle above a critical velocity for particle adhesion. The bonding mechanism is a combination of mechanical interlocking and metallurgical bonding from re-crystallization at highly strained particle interfaces.

The pin bore support sleeve 950 formed by cold spray of an aluminum with elements such as zinc, nickel, chromium, copper, and other metals or metal alloys provides a corrosion and wear resistant coating on an aluminum cast surface. A cold spray applied pin bore support sleeve 950 possess a compression residual stress as opposed to a tensile stress. The residual compressive stress from cold spray can increase crack closure (if formed) and enhance fatigue performance. The fatigue strength can be improved by 10-50%, depending upon the cold spray process parameters used.

Figure 10:
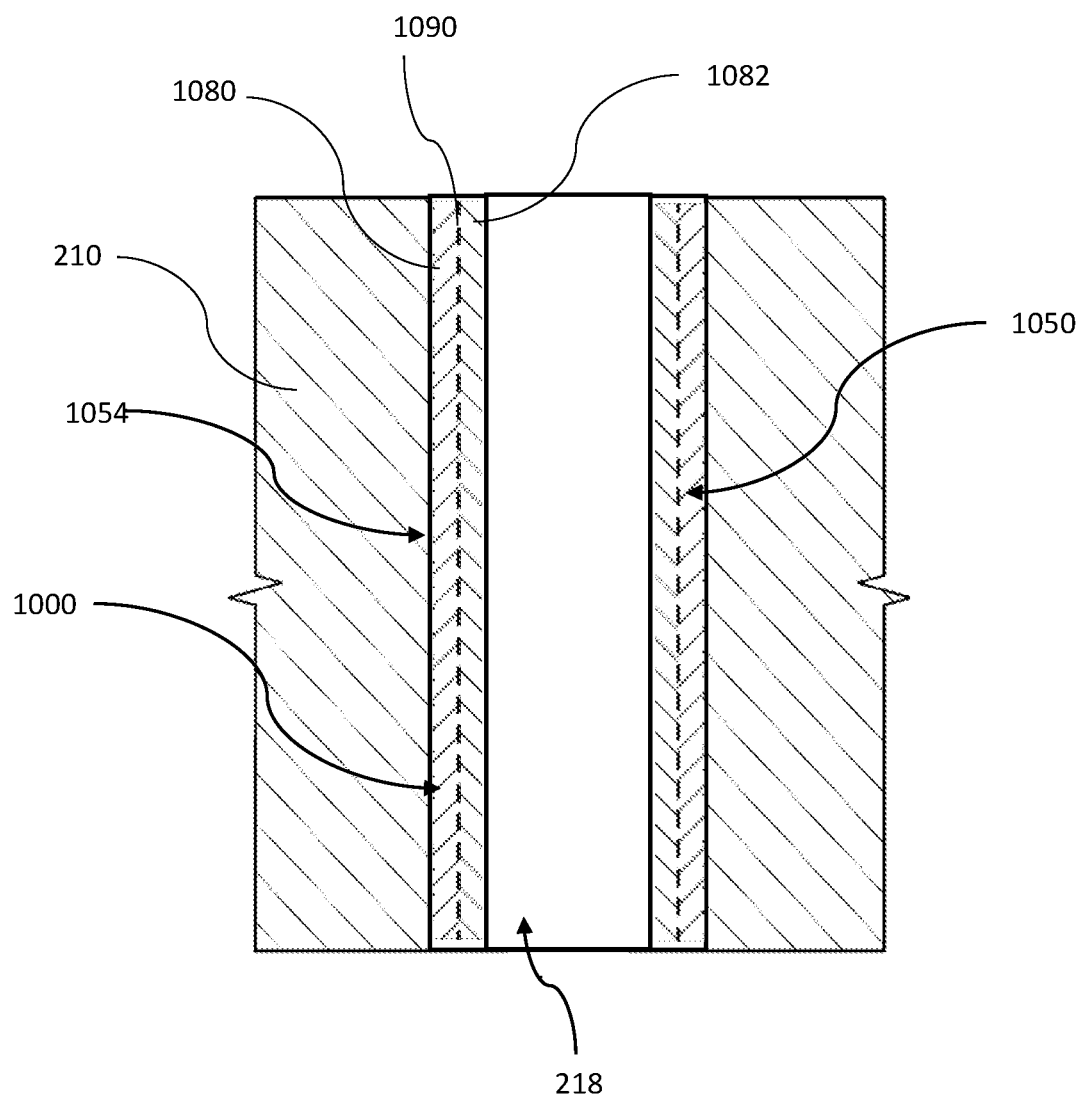
FIG. 10 is an illustration of yet another exemplary embodiment of a pin bore support, according to an exemplary embodiment.

FIG. 10 is an illustration of still yet another exemplary embodiment of the pin bore support sleeve 1050, also referred to as support sleeve 1050. The support sleeve 1050 includes an outer portion 1080, or outer layer 1080, having first metal alloy and an inner portion 1082, or inner layer 1082, having a second metal alloy. The outer portion 1080 includes a cross-sectional area of the sleeve 1000 between the exterior surface 1054 and a mid-line 1090. The inner portion 1082 includes the cross-sectional area of the sleeve 1050 between the interior surface 1082 and a mid-line 1090. In the non-limiting example shown, the support sleeve 1000 may be formed by extruding a blank cylindrical tube having bi-materials, or rolling and joining two edges of a flat sheet stock having two layers of different metal alloys. Alternatively, the support sleeve 1050 may be manufactured by an additive manufacturing (AM) process, such as 3-D printing, in which the metal composition may be tailored during the AM process.

While the vehicle 100 is depicted as a passenger car, other examples of vehicles include, but are not limited to, land vehicles such as motorcycles, trucks, sport utility vehicles (SUVs), and recreational vehicles (RVs), and non-land vehicles including marine vessels and aircrafts. It should be appreciated that an electric vehicle is described, the disclosure of the parking pawl assembly 202 and components such as the pin bore support are also applicable to those on conventional internal combustion vehicles and hybrid-vehicles having a transmission.

The description of the present disclosure is merely exemplary in nature and variations that d$_0$ not depart from the general sense of the present disclosure are intended to be within the scope of the present disclosure. Such variations are not to be regarded as a departure from the spirit and scope of the present disclosure.

What is claimed is:

1. A parking pawl assembly, comprising:
a housing;
a parking pawl having a first end and a second end spaced from the first end, wherein the first end defines a pin bore having an interior bore surface;
a support sleeve disposed in the pin bore, wherein the support sleeve includes an interior surface and exterior surface opposite the interior surface, wherein the exterior surface is engaged to the interior bore surface; and
a pivot pin disposed through the support sleeve, wherein the pivot pin is attached to the housing;
wherein the exterior surface of the support sleeve is interference fitted against the interior bore surface of the pin bore; and
wherein:
the support sleeve includes:
a designed inner diameter ($d_1$),
a designed outer diameter ($d_0$),
an inner diameter ($ID_{sleeve}$), and
an outer diameter ($OD_{sleeve}$);
the pin bore includes an inner diameter ($ID_{bore}$);
the pivot pin includes an outer diameter ($OD_{pin}$);
wherein:
$OD_{sleeve} = d_0 + 0.25\% \, d_0 +/- 0.005$ millimeters (mm);
$ID_{Sleeve} = d_1 \, 0.25\% \, d_1 +/- 0.1\% \, d_1$;
$ID_{Bore} = d_0 +/- 0.010$ to $0.015$ mm; and
$OD_{Pin} = d_1 +/- 0.1\% \, d_1$.

2. The parking pawl assembly of claim 1, wherein the support sleeve includes an end annular surface connecting the interior surface and the exterior surface, the end annular surface defines at least one notch operable to receive a tool end.

3. The parking pawl assembly of claim 1, wherein the support sleeve includes an outer layer having a first metal alloy and an inner layer having a second metal alloy.

4. The parking pawl assembly of claim 1, wherein the pivot pin comprises a steel alloy, the support sleeve comprises a steel alloy, and the parking pawl comprises a cast aluminum alloy.

5. The parking pawl assembly of claim 1, wherein the pivot pin comprises a steel alloy, the support sleeve comprises a cast aluminum alloy, and the parking pawl comprises a cast aluminum alloy.

6. A parking pawl comprising:
a first end and a second end spaced from the first end, wherein the first end defines a pin bore having an interior bore surface; and
a support sleeve disposed in the pin bore, wherein the support sleeve includes an interior surface and exterior surface opposite the interior surface, wherein the exterior surface of the support sleeve is engaged to the interior bore surface; and
wherein:
the support sleeve includes:
a designed inner diameter ($d_1$),
a designed outer diameter ($d_0$),
an inner diameter ($ID_{sleeve}$), and
an outer diameter ($OD_{sleeve}$); and
the pin bore includes an inner diameter ($ID_{bore}$);
wherein:
$OD_{sleeve} = d_0 + 0.25\% \, d_0 +/- 0.005$ millimeters (mm);
$ID_{Sleeve} = d_1 \, 0.25\% \, d_1 +/- 0.1\% \, d_1$; and
$ID_{Bore} = d_0 +/- 0.010$ to $0.015$ mm.

7. The parking pawl of claim 6, wherein:
the exterior surface of the support sleeve defines outer diameter (OD) threads; and
the interior bore surface defines inner diameter (ID) threads configured to receive the OD threads of the support sleeve; and
wherein at least one of the OD threads and the ID threads are rolled threads.

8. The parking pawl of claim 6, wherein the support sleeve is formed of a cold sprayed process by particle deposition onto the interior surface of the pin bore.

9. The parking pawl of claim 6, wherein the exterior surface defines a locking feature; and wherein the interior bore surface is cast onto the locking feature such that the support sleeve is locked in the pin bore of the parking pawl.

10. The parking pawl of claim 6, wherein the support sleeve comprises a steel alloy and the parking pawl comprises a cast aluminum alloy.

11. The parking pawl of claim 6, wherein the support sleeve comprises a cast aluminum alloy and the parking pawl comprises a cast aluminum alloy.

12. The parking pawl of claim 6, wherein the support sleeve comprises a high strength wrought aluminum alloy and the parking pawl comprises a cast aluminum alloy.

13. The parking pawl of claim 6, wherein the support sleeve includes an outer layer having a first metal alloy and an inner layer having a second metal alloy.

14. A pivot pin bore support sleeve comprising:
a cylindrical body having an interior surface and exterior surface opposite the interior surface;
wherein the interior surface defines an inner diameter ($ID_{sleeve}$) that is equal to $d_1 ++/- 0.1\% \, d_1$, wherein $d_1$ is a predetermined inner diameter; and
where the exterior surface includes a feature lockable to an interior surface of a pin bore of a casting.

15. The pivot pin bore support sleeve of claim 14, wherein the feature lockable to the interior surface of the pin bore includes rolled inner diameter threads.

16. The pivot pin bore support sleeve of claim 14, wherein the feature lockable to the interior surface of the pin bore includes at least one of an indentation, a protrusion, a spline, and a texture.

17. The pivot pin bore support sleeve of claim 14, wherein the support sleeve is manufactured by a cold sprayed process onto the interior surface of the pin bore of the casting.

18. The pivot pin bore support sleeve of claim 14, further includes an end annular surface connecting the interior surface and the exterior surface, the end annular surface defines at least one notch operable to receive a tool end.

19. The pivot pin bore support sleeve of claim 14, wherein the cylindrical body includes an outer layer having a first metal alloy and an inner layer having a second metal alloy.

20. The pivot pin bore support sleeve of claim 14, wherein the cylindrical body comprises at least one of a steel alloy, a cast aluminum alloy, and a high strength wrought aluminum alloy.

* * * * *